(12) United States Patent
Rochat (10) Patent No.: US 11,265,079 B2
(45) Date of Patent: Mar. 1, 2022

(54) PROCESS AND DEVICE FOR MEASUREMENT OF PHYSICAL QUANTITY BASED ON RAYLEIGH BACKSCATTERING

(71) Applicant: OMNISENS SA, Morges (CH)

(72) Inventor: Etienne Rochat, Valeyres sous Ursins (CH)

(73) Assignee: OMNISENS SA, Morges (CH)

( * ) Notice: Subject to any disclaimer, the term of this patent is extended or adjusted under 35 U.S.C. 154(b) by 0 days.

(21) Appl. No.: 17/413,491

(22) PCT Filed: Dec. 14, 2018

(86) PCT No.: PCT/EP2018/084861
§ 371 (c)(1),
(2) Date: Jun. 11, 2021

(87) PCT Pub. No.: WO2020/119915
PCT Pub. Date: Jun. 18, 2020

(65) Prior Publication Data
US 2021/0359755 A1    Nov. 18, 2021

(51) Int. Cl.
*H04B 10/071* (2013.01)
*G01M 11/00* (2006.01)
*G01D 5/353* (2006.01)

(52) U.S. Cl.
CPC ....... *H04B 10/071* (2013.01); *G01D 5/35361* (2013.01); *G01M 11/3118* (2013.01); *G01M 11/3127* (2013.01); *G01M 11/3172* (2013.01)

(58) Field of Classification Search
CPC ............. G01M 11/31; G01M 11/3109; G01M 11/3118; G01M 11/3136; G01M 11/3145;
(Continued)

(56) References Cited

U.S. PATENT DOCUMENTS 10,359,302 B2 * 7/2019 Hartog ............... G01D 5/35361
10,794,733 B2 * 10/2020 Lanticq .............. G01D 5/35358
(Continued)

FOREIGN PATENT DOCUMENTS

CN     102412894 A  *  4/2012
CN     102571200 A  *  7/2012
(Continued)

OTHER PUBLICATIONS

International Search Report and Written Opinion received for PCT/EP2018/084861, dated Oct. 16, 2019.
(Continued)

*Primary Examiner* — Gordon J Stock, Jr.
(74) *Attorney, Agent, or Firm* — Greer, Burns & Crain, Ltd (57) ABSTRACT

A process including the following steps:
injecting in an optical fiber a first optical pump at a first optical frequency that evolves in time or not, and a second optical pump at a second optical frequency that evolves in time or not, the first optical frequency and the second optical frequency being different at each given time;
a first detection of a first Rayleigh backscattered signal at the first optical frequency from the optical fiber;
a second detection, separated from the first detection, of a second Rayleigh backscattered signal at the second optical frequency from the optical fiber; and
analyzing the detected first Rayleigh backscattered signal and the detected second Rayleigh backscattered signal.

34 Claims, 5 Drawing Sheets

(58) Field of Classification Search
CPC ......... G01M 11/3154; G01M 11/3163; G01M 11/3172; G01M 11/3181; G01M 11/319; G01D 5/35358; G01D 5/35361; G01D 5/35364; G01D 5/35367; H04B 10/071
See application file for complete search history.

(56) References Cited

U.S. PATENT DOCUMENTS

| | | |
|---|---|---|
| 2010/0078506 A1 | 4/2010 | Stewart |
| 2013/0113629 A1* | 5/2013 | Hartog ............... G01D 5/35303 340/853.2 |
| 2014/0078506 A1 | 3/2014 | Hu et al. |
| 2016/0187224 A1 | 6/2016 | Chen et al. |
| 2018/0156642 A1* | 6/2018 | Wang ................. G01D 5/35335 |
| 2020/0370948 A1* | 11/2020 | Huang .................. G01H 9/004 |
| 2021/0270643 A1* | 9/2021 | Carver ............... G01D 5/35361 |

FOREIGN PATENT DOCUMENTS

| | | |
|---|---|---|
| GB | 2489749 A | 10/2012 |
| WO | 98/30881 A1 | 7/1998 |

OTHER PUBLICATIONS

International Preliminary Report on Patentability received for PCT/EP2018/084861, dated Jan. 13, 2021.

Pastor-Graells, J., et al., "Single-shot distributed temperature and strain tracking using direct detection phase-sensitive OTDR with chirped pulses," Optics Express, vol. 24, No. 12, 2016, p. 13121-13133.

* cited by examiner

PROCESS AND DEVICE FOR MEASUREMENT OF PHYSICAL QUANTITY BASED ON RAYLEIGH BACKSCATTERING

BACKGROUND

The invention preferably (but not necessarily) relates to distributed or fully distributed sensors, in which an optical fiber is a long uninterrupted sensor, and the measured information is extracted from the analysis of backscattered light.

The backscattered light can typically come from the following scatterings:

Rayleigh scattering is the interaction of a light pulse with material impurities (a typical example would be the scattering of sunlight by dust particles in the atmosphere giving to the sky different colors depending on the incident angle of the sun light). It is the largest of the three backscattered signals in silica fibers and has the same wavelength as the incident light. Rayleigh scattering is the physical principle behind Optical Time Domain Reflectometer (OTDR).

Brillouin scattering is the interaction of a light pulse with thermally excited acoustic waves (also called acoustic phonons). Acoustic waves, through the elasto-optic effect, slightly and locally modify the index of refraction. The corresponding moving grating reflects back a small amount of the incident light and shifts its frequency (or wavelength) due to the Doppler Effect. The shift depends on the acoustic velocity in the fiber while its sign depends on the propagation direction of the travelling acoustic waves. Thus, Brillouin backscattering is created at two different frequencies around the incident light, called the Stokes and the Anti-Stokes components. In silica fibers, the Brillouin frequency shift is in the 10 GHz range (0.1 nm in the 1550 nm wavelength range) and is temperature and strain dependent.

Raman scattering is the interaction of a light pulse with thermally excited atomic or molecular vibrations (optical phonons) and is the smallest of the three backscattered signals in intensity. Raman scattering exhibits a large frequency shift of typically 13 THz in silica fibers, corresponding to 100 nm at a wavelength of 1550 nm. The Raman Anti-Stokes component intensity is temperature dependent whereas the Stokes component is nearly temperature insensitive.

The present invention relates to an optical process and device for measurement of physical quantity (strain, temperature and pressure typically modified by acoustic vibration propagating around the optical fiber) based on Rayleigh backscattering.

Rayleigh backscattering (RBS) is commonly used to measure propagation loss in fibre. This is the so-called Optical Time Domain Reflectometry (OTDR). This is done by sending a powerful pulse of broadband light (in order words, incoherent light) into a fibre and looking at the averaged RBS.

When the laser has a narrow linewidth (hence, high coherent), then there is enhanced interferometric noise (coherent noise) on the RBS. When looking at a single RBS (almost no averaging), the comparison of the coherent noise of successive RBS measurements for any given position along the fibre provides information on the local variation of phase at the corresponding position. Since coherent noise is being scrutinized, the technology became known as COTDR (Coherent OTDR) in the industry. The technology has been further developed and one can identify 4 families:

Phase OTDR, also called DAS-I (for "Intensity"), which:
  has the disadvantage of a nonlinear response
  has the disadvantage of Rayleigh fading
  has the disadvantage of polarization fading
  allows intensity measurement
  has the disadvantage of not allowing direct measurement of phase but only phase calculation from mathematical transform of intensity
  has the disadvantage of not allowing measurement of absolute value of temperature or strain but only variations of these physical quantities
  has the disadvantage of not allowing the direction of the change in temperature or strain or pressure
  allows direct detection Coherent OTDR, also called DAS-$\varphi$ (for "phase"), which:
  allows linear response
  has the disadvantage of Rayleigh fading
  has the disadvantage of polarization fading
  allows intensity measurement
  allows phase measurement
  has the disadvantage of not allowing measurement of absolute value of temperature or strain but only variations of these physical quantities
  allows coherent detection
  has the disadvantage of polarization management for coherent detection between signal and local oscillator $\lambda$-scanning OTDR, also called DAS-$\lambda$ (for the $\lambda$ wavelength), which:
  allows linear response
  has no Rayleigh fading
  has the disadvantage of polarization fading
  allows intensity measurement
  allows spectral shift analysis
  allows measurement of temperature or strain or pressure
  allows the direction of the change in temperature or strain or pressure
  allows direct detection
  requires a reference measurement
  has the disadvantage of slow measurement, since it scans Chirped pulse OTDR, also called DAS-ch (for "chirp"), which:
  allows linear response
  has no Rayleigh fading
  has the disadvantage of polarization fading
  allows intensity measurement
  allows temporal shift analysis
  allows measurement of temperature or strain or pressure
  allows the direction of the change in temperature or strain or pressure
  allows direct detection
  requires a reference measurement DAS-$\lambda$ is working similarly to a Brillouin optical time domain reflectometer (BOTDR) in the sense that a pump beam is launched in the fibre successively at frequencies $v_1 \ldots v_n$ whilst corresponding RBS is acquired. The outcome is a RBS matrix for measurement #i.

The process is repeated shortly after (#i+1). As both temperature and strain along the cable are changing over time, RBS1 and RBS2 matrices are slightly different. At each position along the fibre, RBS spectra #i and #i+1 are compared. Although it looks like "noise", both spectra are almost a copy (with some small variation) of each other with a frequency shift. The amount of shift between the two spectra is a combination of temperature and strain effect. The shift can be retrieved for instance using a correlation between the two spectra.

DAS-λ suffers from:
- A slow scanning and averaging process.
- Polarization fading The goal of the invention is to present an optical process or device for measurement of physical quantity based on backscattering which:
- avoids polarization fading, and/or
- allows a high response and performance compared to prior art, i.e. for example with a better signal-to-noise ratio (SNR) and/or with an extended sensing range and/or a reduced measurement time, and/or an improved spatial and/or measured resolution.

SUMMARY

An aspect of the invention concerns a process comprising the following steps:
- injecting (preferably simultaneously) in an optical fiber a first optical pump at a first optical frequency that evolves in time or not, and a second optical pump at a second optical frequency that evolves in time or not, the first optical frequency and the second optical frequency being different at each given time,
- a first detection of a first Rayleigh backscattered signal at the first optical frequency from the optical fiber
- a second detection, separated from the first detection, of a second Rayleigh backscattered signal at the second optical frequency from the optical fiber
- preferably analyzing the detected first Rayleigh backscattered signal and the detected second Rayleigh backscattered signal.

The first optical pump and the second optical pump can have orthogonal polarizations. The first detection and the second detection can be done respectively on two different optical ways after a separation of the first Rayleigh backscattered signal and the second Rayleigh backscattered signal preferably by an optical filter such as a fibre Bragg grating.

The first pump and the second pump can be simultaneously generated from a common source signal.

The first and second optical frequencies can have, in absolute value, the same frequency difference with respect to a source frequency, the source frequency preferably remaining constant in time. The source signal can have an optical frequency equal to the source frequency.

The first detection and the second detection can be locked on the first optical pump or on the second optical pump thanks to a synchronous detection.

Depending on the variant or embodiment:
- the first pump can be an optical pulse or a sequence of optical pulses with the first optical frequency being constant in time, the second pump can be optical pulse or a sequence of optical pulses with the second optical frequency being constant in time,
- The first pump can be a sequence of optical pulses with the first optical frequency changing between each of its optical pulses according to a first coded sequence, the second pump can be a sequence of optical pulses with the second optical frequency changing between each of its optical pulses according to a second coded sequence, the first optical frequency being preferably always different from the second optical frequency at each given time. All the pulses of the first pump and of the second pump can have a same intensity that is preferably constant in time. The first coded sequence can comprise:
  - at least N iterations, N being an integer at least equal to 2, of a sub-sequence comprising N+1 pulses at N+1 different optical frequencies
  - but with a switched-off pulse of the sub-sequence every N pulse of the sub-sequence.
- The first pump can be a chirped optical pulse or a sequence of chirped optical pulses with the first optical frequency changing during each pulse, the second pump being a chirped optical pulse or a sequence of chirped optical pulses with the second optical frequency changing during each pulse, the first optical frequency preferably being always different from the second optical frequency at each given time. The chirped optical pulse or the sequence of chirped optical pulses with the first optical frequency and/or the chirped optical pulse or the sequence of chirped optical pulses with the second optical frequency can comprise a linear or a non-linear chirped pulse.

The first optical frequency can change in time according to a first coded sequence, the second optical frequency can change in time according to a second coded sequence, the first optical frequency preferably being always different from the second optical frequency at each given time. The first coded sequence and second coded sequence can have a same temporal period and are reiterated in time. The temporal period can be substantially equal to twice the length of the optical fiber divided by a speed of light in the optical fiber.

Another aspect of the invention concerns a device comprising:
- injection means arranged for injecting (preferably simultaneously) in an optical fiber a first optical pump at a first optical frequency that evolves in time or not, and a second optical pump at a second optical frequency that evolves in time or not, the first optical frequency and the second optical frequency being different at each given time,
- a detector arranged for a first detection of a first Rayleigh backscattered signal at the first optical frequency from the optical fiber
- a detector arranged for a second detection, separated from the first detection, of a second Rayleigh backscattered signal at the second optical frequency from the optical fiber
- preferably means for analyzing the detected first Rayleigh backscattered signal and the detected second Rayleigh backscattered signal.

The first optical pump and the second optical pump can have orthogonal polarizations. The detector arranged for the first detection and the detector arranged for the second detection can be two distinct detectors located on two different optical ways after separation means arranged for a separation of the first Rayleigh backscattered signal and the second Rayleigh backscattered signal, the separation means preferably comprising a fibre bragg grating.

The injection means can be arranged for simultaneously generating the first pump and the second pump from a common source signal.

The injection means can be arranged so that the first and second optical frequencies have, in absolute value, the same frequency difference with respect to a source frequency, the source frequency preferably remaining constant in time.

The injection means can be arranged so that the source signal has an optical frequency equal to the source frequency.

The detector arranged for the first detection and the detector arranged for the second detection can be locked on the first optical pump or on the second optical pump thanks to a synchronous detection.

Depending on the variant or embodiment:
the injection means can be arranged so that the first pump is an optical pulse or a sequence of optical pulses with the first optical frequency being constant in time, the second pump being an optical pulse or a sequence of optical pulses with the second optical frequency being constant in time.
the injection means can be arranged so that the first pump is a sequence of optical pulses with the first optical frequency changing between each of its optical pulses according to a first coded sequence, the second pump being a sequence of optical pulses with the second optical frequency changing between each of its optical pulses according to a second coded sequence, the first optical frequency preferably being always different from the second optical frequency at each given time. The injection means can be arranged so that all the pulses of the first pump and of the second pump have a same intensity that is preferably constant in time. The injection means can be arranged so that the first coded sequence comprises:
at least N iterations, N being an integer at least equal to 2, of a sub-sequence comprising N+1 pulses at N+1 different optical frequencies
but with a switched-off pulse of the sub-sequence every N pulse of the sub-sequence.

The injection means can be arranged so that the first pump is a chirped optical pulse or a sequence of chirped optical pulses with the first optical frequency changing during each pulse, the second pump being a chirped optical pulse or a sequence of chirped optical pulses with the second optical frequency changing during each pulse, the first optical frequency preferably being always different from the second optical frequency at each given time. The injection means can be arranged so that the chirped optical pulse or the sequence of chirped optical pulses with the first optical frequency and/or the chirped optical pulse or the sequence of chirped optical pulses with the second optical frequency comprise a linear or non-linear chirped pulse.

The injection means can be arranged so that the first optical frequency changes in time according to a first coded sequence, the second optical frequency changes in time according to a second coded sequence, the first optical frequency preferably being always different from the second optical frequency at each given time. The injection means can be arranged so that the first coded sequence and second coded sequence have a same temporal period and are reiterated in time. The injection means can be arranged so that the temporal period is equal to twice the length of the optical fiber divided by a speed of light in the optical fiber.

BRIEF DESCRIPTION OF THE DRAWINGS

Other advantages and characteristics of the invention will appear upon examination of the detailed description of embodiments which are in no way limitative, and of the appended drawings in which:

FIG. 6.a illustrates fast measurement principle with four scanned frequencies

FIG. 6.b illustrates fast measurement principle with the unique sequence ("US") with code length N=3, FIG. 6.c illustrates the decoding scheme of the unique sequence "US"

DETAILED DESCRIPTION

These embodiments being in no way limitative, we can consider variants of the invention including only a selection of characteristics subsequently described or illustrated, isolated from other described or illustrated characteristics (even if this selection is taken from a sentence containing these other characteristics), if this selection of characteristics is sufficient to give a technical advantage or to distinguish the invention over the state of the art. This selection includes at least one characteristic, preferably a functional characteristic without structural details, or with only a part of the structural details if that part is sufficient to give a technical advantage or to distinguish the invention over the state of the art.

We are now going to describe, in references to all the figures, a first embodiment of a device 1 according to the invention implementing various embodiments of a process according to the invention.

Figure 1:
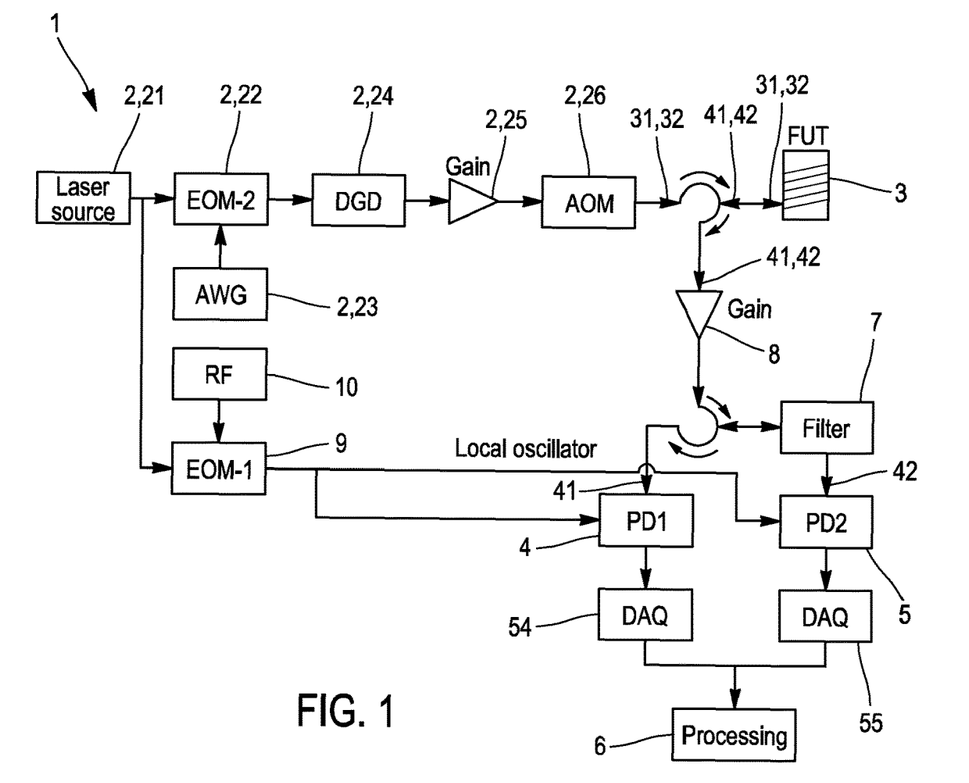
FIG. 1 illustrates a first embodiment of a device 1 according to the invention.

As illustrated in FIG. 1, the device 1 comprises injection means 2 arranged for simultaneously injecting in an optical fiber 3 (or "Fibre under test" (FUT)) a first optical pump 31 at a first optical frequency that evolves in time or not, and a second optical pump 32 at a second optical frequency that evolves in time or not, the first optical frequency and the second optical frequency being different at each given time.

Depending on the considered variant, device 1 may comprises fiber 3 but usually fiber 3 is not a part of device 1 but is a fiber 3 tested or monitored by device 1.

Device 1 comprises a detector 4 arranged for detecting (according to a "first detection") a first Rayleigh backscattered signal 41 at the first optical frequency from the optical fiber.

Device 1 comprises a detector 5 arranged for detecting (according to a "second detection", separated from the first detection) a second Rayleigh backscattered signal 42 at the second optical frequency from the optical fiber.

Device 1 further comprises means 6 for analyzing the detected first Rayleigh backscattered signal and the detected second Rayleigh backscattered signal, in order to determine a physical quantity (such like strain, temperature and pressure) in the fiber 3 and/or an acoustic vibration in the optical fiber 3.

Means 6 are technical means.

Means 6 can comprise at least one computer, one central processing or computing unit, one analogue electronic circuit (preferably dedicated), one digital electronic circuit (preferably dedicated) and/or one microprocessor (preferably dedicated) and/or software means and/or graphical processing unit (GPU).

Injections means 2 comprise a laser 21. Laser 21 is a narrow and stable laser source. The quality and the stability of the laser may vary depending on the final mode off realization. Laser 21 typically has a wavelength in the visible or infra-red range, for example equal to 1550 nm, and a power of higher than 1 mW for example equal to 40 mW.

Laser 21 is arranged to generate a source signal having an optical frequency equal to source frequency $f_0$.

The injection means 2 are arranged for simultaneously generating the first pump 31 and the second pump 32 from the common source signal.

Injection means 2 comprise an Electro Optic Modulator (EOM 2) referenced 22, a telecommunication grade modulator, based on Mach-Zehnder interferometer structure. The EOM is used mainly in Double-sideband suppressed-carrier scheme (the EOM is biased so that the carrier is completely suppressed and a radio frequency (RF) signal is applied to generate side bands).

The injection means 2 are thus arranged so that the first and second optical frequencies have, in absolute value, the same frequency difference (or substantially the same frequency difference, i.e. the two frequency differences are equal±0.01%) with respect to the source frequency $f_0$, the source frequency remaining constant in time (or substantially constant in time i.e. equal to a constant value $f_0$±0.01%).

EOM 22 is an electro-optic modulator, mainly a Mach-Zehnder Modulator MZM as it is sometimes refer to in the literature. Here, the MZM is biased at 0 transmission so that when RF is applied, we get two side-bands (Double-sideband suppressed-carrier modulation). Each side band can be seen as a pump respectively 31, 32, so we are now in a double Rayleigh pump system, which is not conventional.

EOM 22 is thus arranged:
to generate first optical frequency f1 and second optical frequency $f'_1$ around $f_0$ where $|f_0-f_1|=|f_0-f'_1|$ and $f_1 \neq f'_1$, and/or
if needed, applying a code and/or a chirp to the first optical pump 31 and to the second optical pump 32 in order to transform their frequencies so that it move symmetrically around the carrier $f_0$. For example, $f_0$=200 THz, $f_1$=200.01 THz and $f'_1$=199.99 THz, with 5 GHz chirp, frequencies vary from 200.01 to 200.015 THz on $f_1$ side and from 199.99 to 199.995 THz on $f'_1$ side.

The injection means 2 comprise an arbitrary waveform generator (AWG) 23 (for a linear chirp, other frequency generator could be used).

The generator 23 comprises an electronic circuit that can generate RF signal to drive the EOM-2 22. AWG 23 can change frequency quickly and apply time modulation on the generated frequency (on-off for pulsing the light). The response time and transition time of the AWG 23 is important. For instance, assuming a 10 ns pulse duration, the system must have a raising time/falling time typically <1 ns otherwise the pulse will be distorted. Frequency change should be short as well (order of ns).

The injection means 2 comprise a differential group delay (DGD) 24, typically a piece of Polarization-maintaining (PM) fibre spliced at 45° with respect of the exit of the EOM 22. The two pumps 31, 32 having different frequencies have different group velocities. The length of the DGD 24 is arranged so that (it depends on the birefringence of the PM fibre and the frequency difference between the pumps 31, 32), at the exit of the DGD 24, the two pumps 31, 32 are orthogonal. For a demonstration with 22 GHz separation, pumps 31, 32 were orthogonal after 20 m of panda PM fibre.

This way the first optical pump 31 and the second optical pump 32 have orthogonal polarizations.

This avoids polarization fading.

The injection means 2 comprises an amplifier 25 (more precisely an Erbium Doped Fiber Amplifier (EDFA), when working at 1550 nm; in theory other wavelengths are possible too) arranged to increase the power of the first optical pump 31 and of the second optical pump 32.

The injection means 2 comprise an acousto-optic modulator 26 (a moving grating in a crystal) that applies a Doppler shift to the input frequencies (shift identical to all; EOM applies shift that are symmetric around the carrier). The AOM can be used as an alternative for chirp generation. For example, $f_0$=200 THz, $f_1$=200.01 and $f'_1$=199.99, with 5 GHz chirp, frequencies vary from 200.01 to 200.015 on $f_1$ side and from 199.99 to 199.995 on $f'_1$ side.

The difference between AOM chirp and EOM chirp brings technical advantages:
as frequency chirp goes in the same direction, two RBS can be superimposed on a single detection whilst keeping polarization management
if used for pulse generation, better extinction ratio (ER) than EOM, thus less continuous DC signal passing through and a resulting better SNR over long distance AOM 26 is also used to make intensity pulse (instead of the EOM 22), after amplifier 25 for flatter code.

Device 1 comprises an optical amplifier 8 (with an Amplified Stimulated Emission (ASE) filter) arranged two increase the power of the Rayleigh signal 41 and of the Rayleigh signal 42 on each photo-diode (PD) respectively 4 or 5.

Device 1 comprises means 7 arranged for splitting the two Rayleigh backscattering components 41, 42. A Fiber Bragg grating (FBG) can be used (wavelength filtering).

Device 1 is arranged for a split detection of the two Rayleigh components 41, 42.

Thus, the detector 4 arranged for the first detection and the detector 5 arranged for the second detection are two distinct detectors located on two different optical ways after separation means 7 arranged for a separation of the first Rayleigh backscattered signal and the second Rayleigh backscattered signal, the separation means preferably comprising a fibre bragg grating.

The Data Acquisition means (DAQ) respectively 54, 55 of detector respectively 4, 5 have a bandwidth sufficient for spatial resolution (for instance 1 m corresponds to 10 ns pulse duration, thus 100 MHz bandwidth; DAQ needs 200 MHz).

Then the DAQ have a bandwidth to cover the chirp or the amplitude of the time-frequency code if the pumps 31, 32 are coded. This is more in the 2-3 GHz.

The bandwidth of each detector 4, 5 is equal or superior of the bandwidth of the corresponding DAQ 54, 55.

The detector 4 arranged for the first detection and the detector 5 arranged for the second detection are locked on the first optical pump and/or on the second optical pump and/or on the common source signal thanks to a coherent and/or synchronous detection.

To improve detection of small signal or to measure over longer distance or faster, coherent detection is used.

Coherent detection is arranged for combining a local oscillator (LO) with the Rayleigh signal respectively 41 or 42.

LO is a portion of source 21, the rest is used to generate pumps 31, 32 (LO can be subsequently split in two, for each detector 4, 5). But the resulting signal is located at the $|f_1-f_0|$ frequency (beat signal). If $|f_1-f_0|=10$ GHz, then a high bandwidth photodetector 4 or 5 is required, which is expensive and difficult to work with.

Coherent and/or synchronous detection of device 1 comprises an Electro Optic Modulator (EOM-1) referenced 9 and a Radio-Frequency (RF) generator 10.

For example, EOM 9 is driven by constant RF signal at df (from generator 10) in such a way that output is two frequencies, for instance f1+df and f1−df. Then, the beat signal is at df, could be a few 100 MHz only and the bandwidth of the DAQ is now given by the chirp if a chirp is used.

FIG. 1 is just a schematic illustration of device 1. In fact:
in case of two separated detectors 4, 5, the first LO and signal 41 enter by the same optical input of detector 4 and the second LO and signal 42 enter by the same optical input of detector 5;
in case of a balanced detector replacing the detectors 4, 5, then the first LO and signal 41 and the second LO and signal 42 are all combined before reaching this balanced detector.

Figure 2:
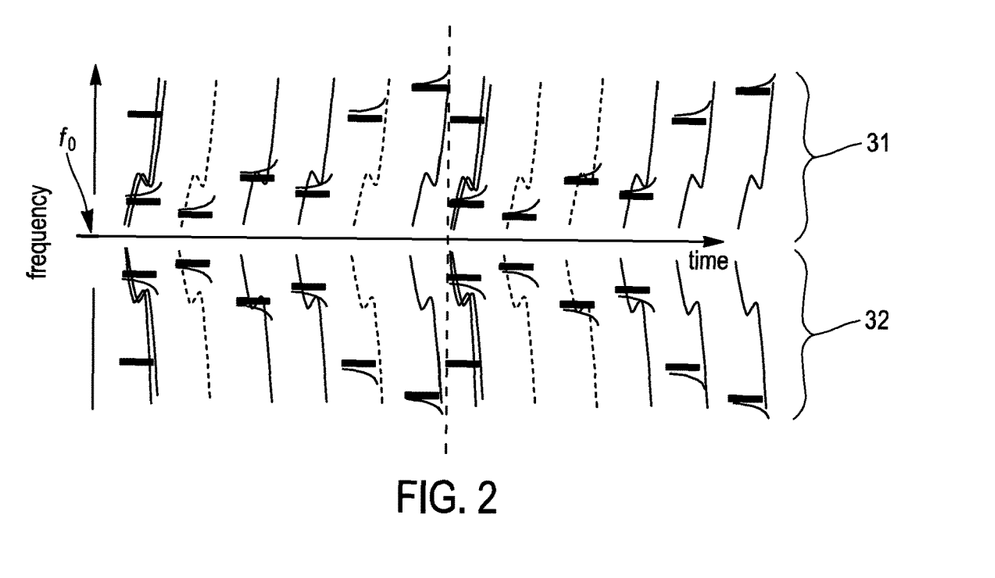
FIG. 2 is a superposition of FIGS. 3, 4, 7, 8 and 9.
Figure 7:
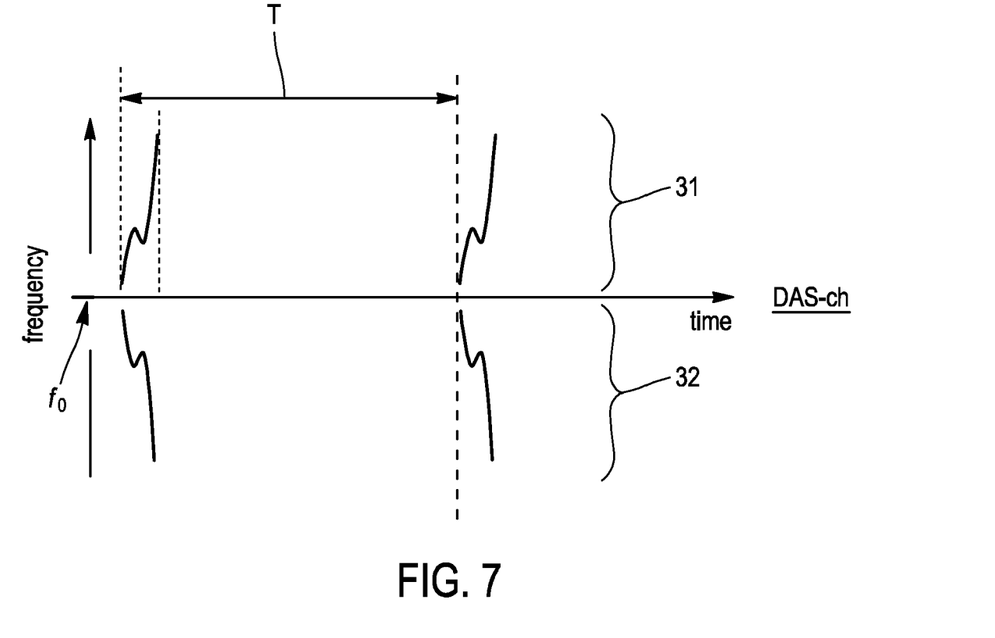
FIG. 7 illustrates the frequency as a function of time of the first pump 31 and of the second pump 32 in a third embodiment of a process according to the invention implemented in device 1.
Figure 8:
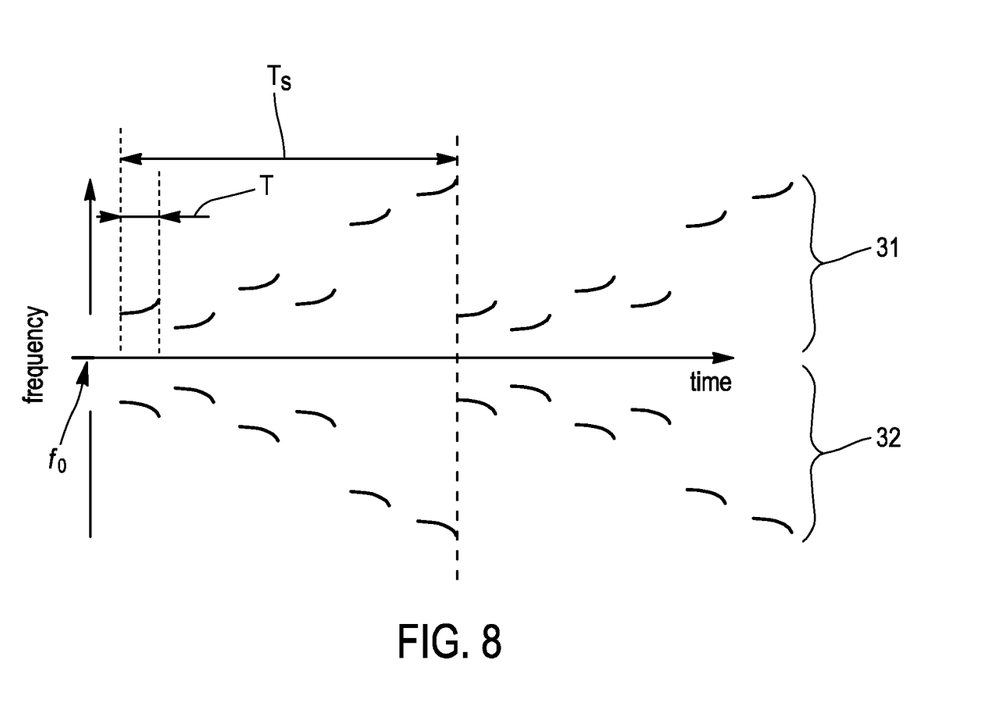
FIG. 8 illustrates the frequency as a function of time of the first pump 31 and of the second pump 32 in a fourth embodiment of a process according to the invention implemented in device 1.
Figure 9:
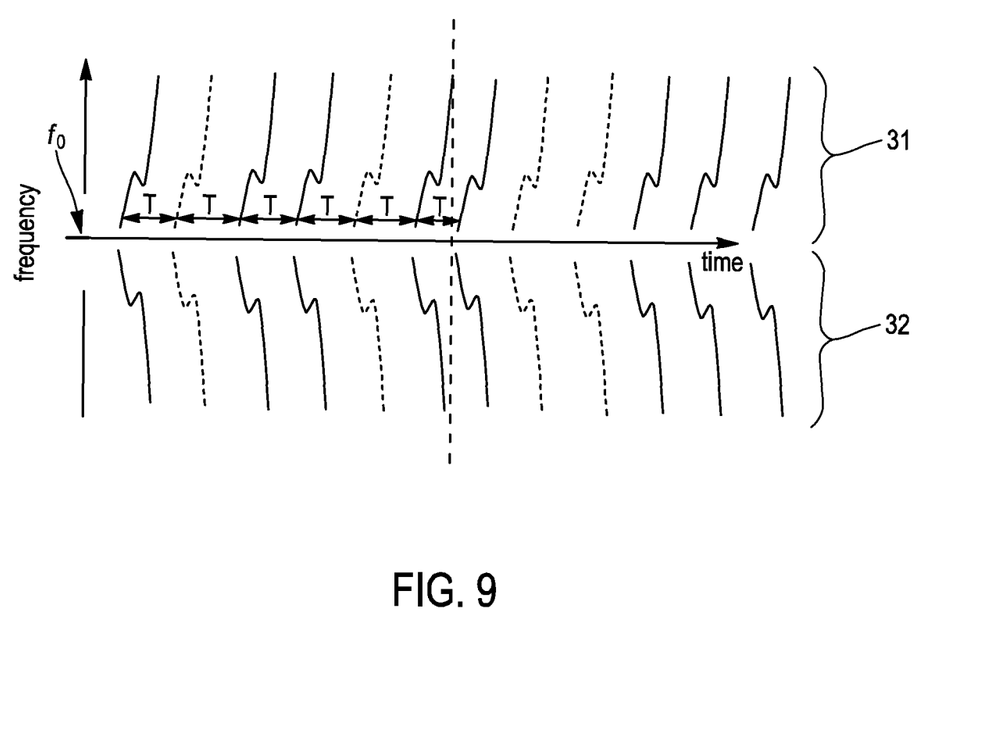
FIG. 9 illustrates the frequency as a function of time of the first pump 31 and of the second pump 32 in a fifth embodiment of a process according to the invention implemented in device 1.

The injection means 2 are arranged so that the first pump 31 is an optical pulse or a sequence of optical pulses, the second pump 32 being an optical pulse or a sequence of optical pulses, and device 1 is thus arranged for generating pump 31 and 32 according to various variants (FIG. 2), for example among:
each pulse of the first pump 31:
can be identical compared to the other pulses (FIGS. 3, 7), each pulse being preferably iterated at a given constant temporal period T or
can be a pulse of a sequence of pulses coded in frequency (i.e. each pulse has the same frequency variation as a function of time compared to the other pulses of the sequence but has a different frequency value at the beginning of this pulse compared to the other pulses of the sequence) (FIGS. 4, 8) and/or can be coded in intensity (i.e. each pulse can be iterated at a given constant temporal period T with some iteration a full intensity ("switched on" pulse) and some iteration at zero intensity ("switched off" pulse)) (FIG. 9), and/or
each pulse of the first pump 31:
can have constant frequency as a function of time within each pulse (FIGS. 3, 4), each pulse being preferably iterated at a given constant temporal period T, or
can be chirped i.e. have a frequency variation as a function of time within each pulse (FIGS. 7, 8, 9)

In a similar way:
each pulse of the second pump 32:
can be identical compared to the other pulses or
can be a pulse of a sequence of pulses coded in frequency (i.e. each pulse has the same frequency variation as a function of time compared to the other pulses of the sequence but has a different frequency value at the beginning of this pulse compared to the other pulses of the sequence) (FIGS. 4, 8) and/or can be coded in intensity (i.e. each pulse can be iterated at a given constant temporal period T with some iteration a full intensity ("switched on") and some iteration at zero intensity ("switched off")) (FIG. 9), and/or
each pulse of the second pump 32:
can have constant frequency as a function of time within each pulse (FIGS. 3, 4), or
can be chirped i.e. have a frequency variation as a function of time within each pulse (FIGS. 7, 8, 9)

Device 1 is thus arranged for generating pump 31 and 32 according to various variants (FIG. 2) among:
the injection means are arranged so that the first pump 31 is an optical pulse (FIG. 3) or a sequence of optical pulses with the first optical frequency $f_1$ being constant in time (or substantially constant in time i.e. equal to a constant value $f_1 \pm 0.01\%$), the second pump 32 being an optical pulse or a sequence of optical pulses with the second optical frequency $f'_1$ being constant in time (or substantially constant in time i.e. equal to a constant value $f'_1 \pm 0.01\%$).
the injection means are arranged so that the first pump 31 is a sequence of optical pulses (FIGS. 4 and 8) with the first optical frequency $f_1$, $f_2$, $f_3$, $f_4$, etc. (preferably remaining constant within pulse duration (FIG. 4), but may be chirped (FIG. 8) with preferably the same shape between each pulse) changing between each of its optical pulses according to a first coded sequence, the second pump 32 being a sequence of optical pulses with the second optical frequency $f'_1$, $f'_2$, $f'_3$, $f'_4$, etc. (preferably remaining constant within pulse duration) changing between each of its optical pulses according to a second coded sequence, the first optical frequency $f_1$, $f_2$, $f_3$, $f_4$, etc. being always different from the second optical frequency $f'_1$, $f'_2$, $f'_3$, $f'_4$, etc. at each given time. The injection means 2 are arranged so that all the pulses of the first pump 31 and of the second pump 32 have a same intensity that is constant in time (or substantially constant in time i.e. equal to a constant value I±10%).
The injection means 2 are arranged so that:
The first coded sequence preferably comprises at least N iterations, N being an integer at least equal to 2, of a sub-sequence 51 comprising N+1 pulses at N+1 different optical frequencies, but with a switched-off pulse of the sub-sequence every N pulse of the sub-sequence (this coded sequence will be described further in the description).
The second coded sequence preferably comprises at least N iterations, N being the integer at least equal to 2, of a sub-sequence comprising N+1 pulses at N+1 different optical frequencies, but with a switched-off pulse of the sub-sequence every N pulse of the sub-sequence (this coded sequence will be described further in the description).
the injection means are arranged so that the first pump 31 is a chirped optical pulse (FIG. 7) or a sequence of chirped optical pulses (FIGS. 8 and 9) with the first optical frequency changing during each pulse, the second pump being a chirped optical pulse or a sequence of chirped optical pulses with the second optical frequency changing during each pulse, the first optical frequency being always different from the second optical frequency at each given time. The injection means are preferably arranged so that the chirped optical pulse or the sequence of chirped optical pulses with the first optical frequency and/or the chirped optical pulse or the sequence of chirped optical pulses with the second optical frequency comprise a non-linear chirped pulse.

In a general way, the injection means 2 are arranged so that the first optical frequency changes in time according to a first coded sequence, the second optical frequency changes in time according to a second coded sequence, the first optical frequency being always different from the second optical frequency at each given time. The injection means 2 are arranged so that the first coded sequence and second coded sequence have a same temporal period and are reiterated in time. The injection means 2 are arranged so that the temporal period is substantially equal to twice the length of the optical fiber divided by a speed of light in the optical fiber.

Using the DGD module 24, one gets two orthogonal pumps. This allows to solve the issue of polarization fading without the need of a polarization scrambler or diversity.

Then, we can apply different modulation signals:
Modulation is a constant RF: this is a DAS-phi.
Modulation is a linear or non-linear chirp: this is a DAS-ch.
Modulation is a frequency coded sequence (also called "t-f code"): this is a DAS-λ

In addition, device 1 can work with conventional laser instead of narrow line with laser when working with multiple pulses travelling along the fibre as when using codes. Although counter-intuitive in distributed sensing, coding does not specifically requires narrow linewidth laser.

We are now going to describe, in reference to FIGS. 1 to 9, various embodiments of a process according to the invention implemented in the device 1 previously described.

In all the embodiments further describes, the process according to the invention comprises the following steps:
simultaneously injecting (by means 2) in the optical fiber 3 the first optical pump 31 at the first optical frequency that evolves in time or not, and the second optical pump 32 at the second optical frequency that evolves in time or not, the first optical frequency and the second optical frequency being different at each given time,
a first detection (by detector 4) of the first Rayleigh backscattered signal 41 at the first optical frequency from the optical fiber; of course, if the first optical frequency of the first optical pump 31 evolves in time, then the first optical frequency of the detected first Rayleigh backscattered signal 41 evolves in the same way;
a second detection (by detector 5), separated from the first detection, of a second Rayleigh backscattered signal 42 at the second optical frequency from the optical fiber; of course, if the second optical frequency of the second optical pump 32 evolves in time, then the second optical frequency of the detected second Rayleigh backscattered signal 42 evolves in the same way;
analyzing (by means 6) the detected first Rayleigh backscattered signal and the detected second Rayleigh backscattered signal, in order to determine a physical quantity (such like strain, temperature and pressure) in the fiber 3 and/or an acoustic vibration in the optical fiber 3.

Thanks to means 24, the first optical pump 31 and the second optical pump 32 have orthogonal polarizations.

It is possible to eliminate the detrimental four wave mixing interaction between the pumps simply by making the polarization states of the pumps 31, 32 orthogonal, so that the maximal optical power of the pumps that can be injected into the FUT can be set to a level as high as conventional DAS system. Orthogonality is achieved for instance using the differential group delay 24 (DGD, a length of PM fibre, input at 45° with respect to the principal direction, and long enough so that DGD results in a 90° difference between the 2 frequencies).

The first detection and the second detection are done respectively on two different optical ways (comprising respectively means 4, 54 and 5, 55) after a separation (by means 7) of the first Rayleigh backscattered signal 41 and the second Rayleigh backscattered 42 signal preferably by a fibre bragg grating 7.

The first pump 31 and the second pump 32 are simultaneously generated from a common source signal (i.e from the laser 21).

The first and second optical frequencies have, in absolute value, the same frequency difference (or substantially the same frequency difference, i.e. the two frequency differences are equal±0.01%) with respect to the source frequency $f_0$, the source frequency remaining constant in time (thanks to EOM 22) or substantially constant in time i.e. equal to a constant value $f_0$±0.01%.

As one can see in FIGS. 3, 4, 7, 8 and 9, optical frequencies of pump 31 and pump 32 are always symmetrical with respect to source frequency $f_0$.

The source signal has an optical frequency $f_0$, equal to the source frequency $f_0$, The first detection and the second detection are locked on the first optical pump 31 and/or on the second optical pump 32 and/or on the source signal (of laser 21) thanks to the coherent and/or synchronous detection.

The first pump 31 is an optical pulse or a sequence of optical pulses, the second pump 32 is an optical pulse or a sequence of optical pulses, and depending on the different embodiments of the invention:
each pulse of the first pump 31:
is identical compared to the other pulses (FIGS. 3, 7) each pulse being preferably iterated at a given constant temporal period T or
is a pulse of a sequence of pulses coded in frequency (i.e. each pulse has the same frequency variation as a function of time compared to the other pulses of the sequence but has a different frequency value at the beginning of this pulse compared to the other pulses of the sequence) (FIGS. 4, 8) and/or is coded in intensity (i.e. each pulse can be iterated at a given constant temporal period T with some iteration a full intensity ("switched on" pulse) and some iteration at zero intensity ("switched off" pulse)) (FIG. 9)
and/or
each pulse of the first pump 31:
has a constant frequency as a function of time within each pulse (FIGS. 3, 4), or
is chirped i.e. have a frequency variation as a function of time within each pulse (FIGS. 7, 8, 9)
and/or
each pulse of the second pump 32:

is identical compared to the other pulses each pulse being preferably iterated at a given constant temporal period T or is a pulse of a sequence of pulses coded in frequency (i.e. each pulse has the same frequency variation as a function of time compared to the other pulses of the sequence but has a different frequency value at the beginning of this pulse compared to the other pulses of the sequence) and/or is coded in intensity (i.e. each pulse can be iterated at a given constant temporal period T with some iteration a full intensity ("switched on" pulse) and some iteration at zero intensity ("switched off" pulse))

and/or each pulse of the second pump 32:

has a constant frequency as a function of time within each pulse, or is chirped i.e. have a frequency variation as a function of time within each pulse.

Coding consists in sending multiple pulses into the fibre 3 rather than a single one. The code can be understood as a word made of 1s and 0s (the letters), where "10011101001 . . . " corresponds to the word #W1. The backscattering is now the result of this multi-pulses sequence.

In case of coding, multiple words are sent successively in the fibre 3 (#w1, #w2, . . . #wi) for each pump 31, 32. Knowing the words and the corresponding backscattering, the process then comprises computing a decoded backscattering that corresponds to the usual signal. A code can improve significantly the signal to noise ratio by as much as 10 dB.

A possible code used here for sensing is intensity based code (for instance so called Simplex code) where the 1s and 0s correspond to "pulse" and "no pulse" in the sequence.

All the pulses (or at least all the "on" pulses in case of an intensity coded sequence) of the first pump 31 and of the second pump 32 have a same intensity that is constant in time (or substantially constant in time i.e. equal to a constant value I±10%).

In case of a frequency coded sequence, the first optical frequency changes in time according to a first coded sequence, the second optical frequency changes in time according to a second coded sequence, the first optical frequency being always different from the second optical frequency at each given time. Frequency code can be used thanks to the use of the EOM 22 (electro-optic modulator, mainly a Mach-Zehnder Modulator MZM as it is sometimes refer to in the literature).

In case of a respectively intensity or phase or polarization (by inserting a phase and/or polarization modulator in device 1) coded sequence, the respectively intensity or phase or polarization of each pulse of pump 31 changes in time according to a first coded sequence, the respectively intensity or phase or polarization of each pulse of pump 32 changes in time according to a second coded sequence. When the MZM 22 is used for intensity modulation (instead of direct laser modulation or other intensity modulation scheme using semi-conductor optical amplifiers or acousto-optic modulator etc), it is biased similarly to telecommunication, namely at ½ transmission and the RF signal is applied to vary between 0 and 1.

In case of any type of coded sequence, the first coded sequence and second coded sequence have a same temporal period $T_S$ and are preferably reiterated in time. Temporal period $T_S$ is substantially equal to twice the length L of the optical fiber divided by the speed of light c in the optical fiber: $T_S=2L/(c)\pm5\%$.

DAS-I or DAS-φ

Figure 3:
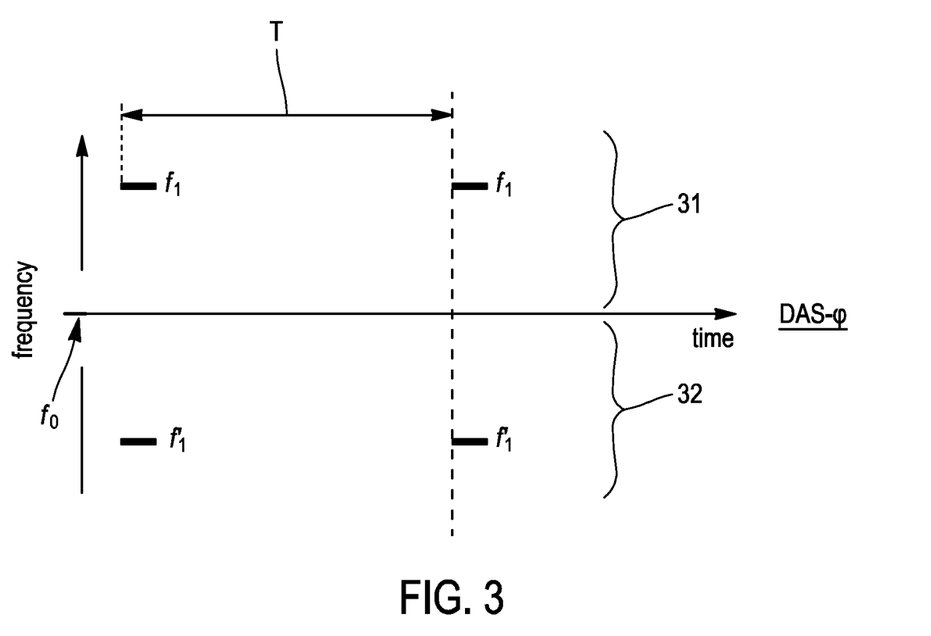
FIG. 3 illustrates the frequency as a function of time of the first pump 31 and of the second pump 32 in a first embodiment of a process according to the invention implemented in device 1.

In a first embodiment of a process according to the invention implemented in device 1 and illustrated in FIG. 3, the first pump 31 is an optical pulse or a sequence of optical pulses with the first optical frequency $f_1$ being constant in time (or substantially constant in time i.e. equal to a constant value $f_1\pm0.01\%$) within each pulse and for each pulse compared to the other pulses, the second pump 32 being an optical pulse or a sequence of optical pulses with the second optical frequency $f'_1$ being constant in time (or substantially constant in time i.e. equal to a constant value $f'_1\pm0.01\%$) within each pulse and for each pulse compared to the other pulses.

If phase is recovered (with coherent detection), then this is the case of DAS-φ. If not, then it is the case of DAS-I.

For DAS-φ, AOM 26 is preferably removed and EOM1 9 is preferably removed. EOM2 22 is kept, as it provides the two pumps and the two LO (in this case, separating the two LO is done after the EOM 22).

The two pumps 31, 32 are lunched in the fibre 3, generating two Rayleigh signals 41, 42. Those two basckattering signals are directed towards detectors 4, 5 or in a variant combined on a balanced detector (the two detectors 4, 5 are replaced by a balanced detector and each signal 41, 42 goes to one side of this balanced detector) which simplifies the problem of polarization fading and/or and Rayleigh fading. RBS is acquired, this is measurement M1.

A second acquisition M2 is performed, then M3 etc. . . .

Due to any fluctuation of temperature or strain along the fibre 3, at a position Li along the fibre 3, there will be a difference in the intensity of the RBS. Thus, there is, at every position along the fibre 3, variation of the RBS intensity. Using M1 as a reference, then one computes M2−M1, M3−M1 (keeping a constant reference) or purely in relative mode, M2−M1, M3−M2 and so forth. At position Li, one has now the evolution of the intensity with respect to the reference. If the intensity difference remains 0, nothing is happening at this position. If it changes as a function of time, then the analysis of the intensity as a function of time can be related to a perturbation.

When a local oscillator is combined with the RBS, then detection becomes sensitive to the phase of the incoming RBS in addition to its intensity. As the phase is known, the perturbation is much more characterized and the response becomes linear.

The data processing still relays on the difference between traces and the subsequent analysis of the time evolution The use of the two pumps 31, 32 have the technical advantages of eliminating the polarization fading and increasing total pump power, thus the SNR.

DAS-λ

Figure 4:
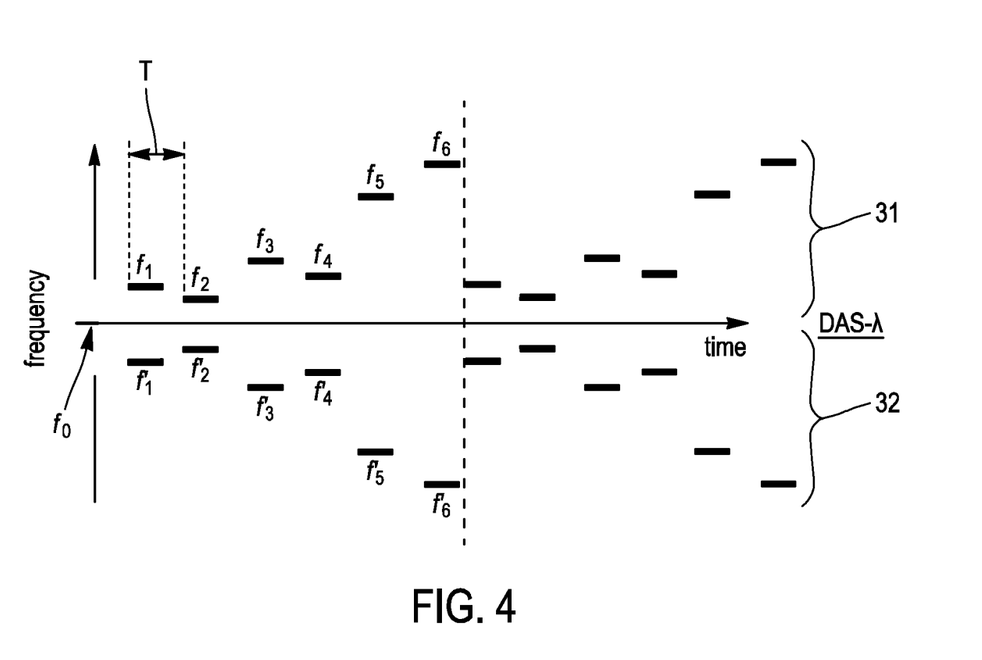
FIG. 4 illustrates the frequency as a function of time of the first pump 31 and of the second pump 32 in a second embodiment of a process according to the invention implemented in device 1, FIGS. 5.a and 5.b illustrate two spectra (as a function of frequency) of measurements according to the invention at two subsequent times t1 and t2 in FIG. 6, $T_{FUT}$ being the transit time in the sensing fibre 3.
Figure 5A:
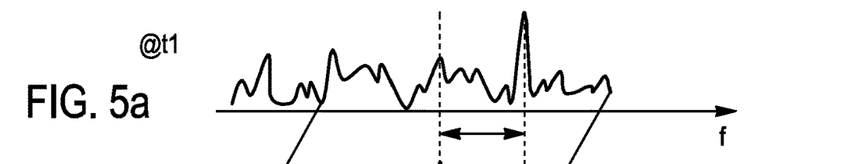
Figure 5B:
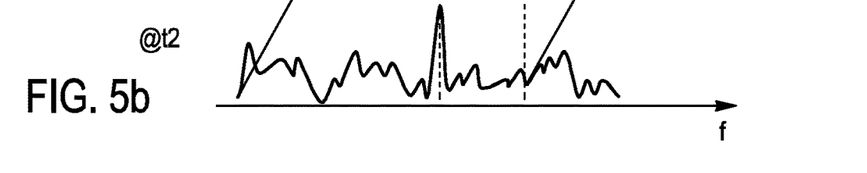
Figure 6A:
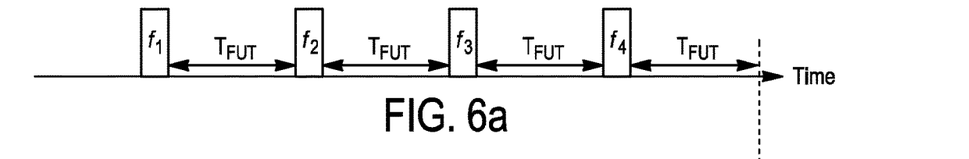
Figure 6B:
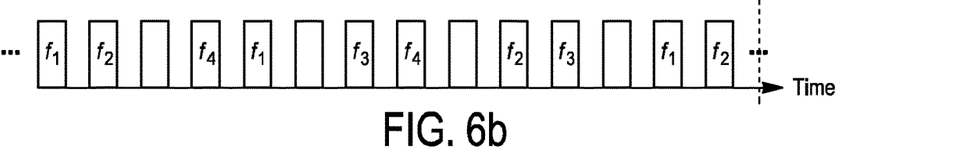
Figure 6C:
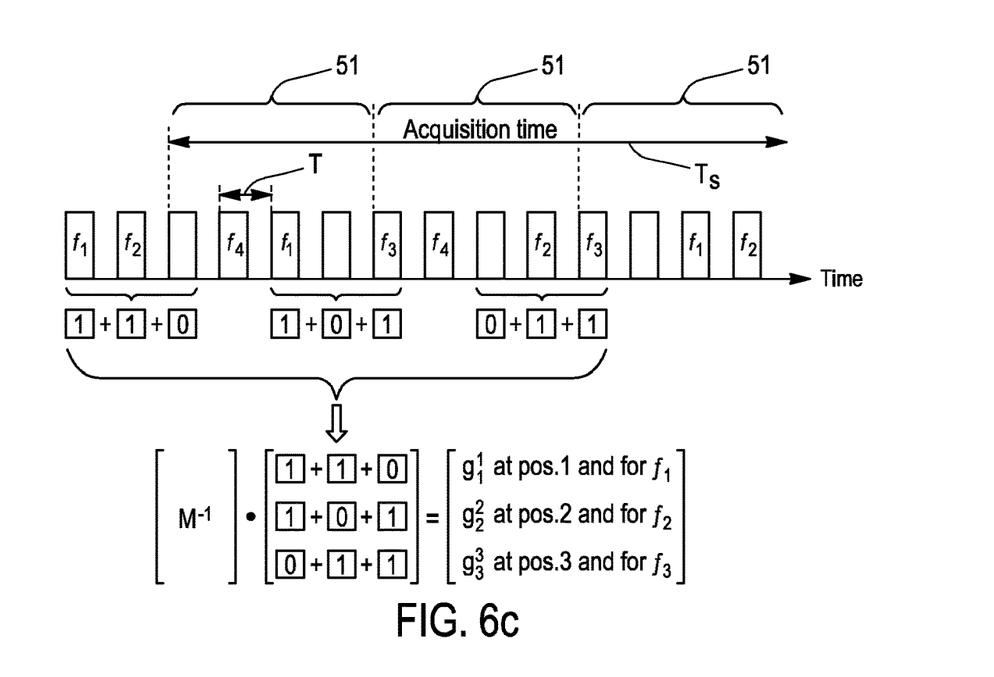

In a second embodiment of a process according to the invention implemented in device 1 and illustrated in FIGS. 4 to 6:

the first pump 31 is an optical pulse or a sequence of optical pulses with the first optical frequency being constant in time within each pulse, the second pump 32 being an optical pulse or a sequence of optical pulses with the second optical frequency being constant in time within each pulse.

More precisely, according to the general concept illustrated in FIG. 4:

the first pump 31 is a sequence (or unique sequence "US") of optical pulses with the first optical frequency being constant in time within each pulse but changing between each of its optical pulses according to a first coded sequence, the second pump 32 being a sequence (or unique sequence "US") of optical pulses with the second optical frequency being constant in time within each pulse but changing between each of its optical pulses according to a second coded sequence, the first optical frequency being always different from the second optical frequency at each given time.

In the more specific embodiment illustrated in FIG. 6, the first coded sequence comprises:

at least N iterations, N being an integer at least equal to 2, of a sub-sequence 51 comprising N+1 pulses at N+1 different optical frequencies but with a switched-off pulse of the sub-sequence every N pulse of this sub-sequence.

Likewise, the second coded sequence comprises:

at least N iterations, N being the same integer at least equal to 2, of a symmetrical (compared $f_0$) sub-sequence comprising N+1 pulses at N+1 different optical frequencies, but with a switched-off pulse of the sub-sequence every N pulse of this symmetrical sub-sequence.

The distributed sensor 1 records a counter-propagative signal that results from a pump signal 31, 32 that is launched into the sensing fibre 3. When one pump 31, 32 is launched into the sensing fiber 3, the counter-propagative signal 41, 42 is recorded during the transit time of the pump pulse.

In the case of a train of N pump pulses per pump 31 or 32, the signal that is recorded is the superposition of the counter-propagative signals coming from the pump pulses and at different locations in the sensing fibre 3.

The Unique Sequence (US) is a long sequence of frequency (or respectively phase or polarization in variants of the present embodiment) coded pump pulses running in loop.

The acquisition time of a US is equivalent to a conventional sensor that launches each pulse at a distinct frequency in the sensing fibre, then waits for the pulse to exit the sensing fibre before launching a new pulse with another frequency (FIG. 6.b).

The US is able to reconstruct a 3D map where one axis is the time (position in the sensing fibre), the second axis is in frequency (or respectively phase or polarization in variants of the present embodiment) and the third is an amplitude.

With the US, it is possible to retrieve the 3D map in one shot.

There is no additional information of the 3D map (no redundancy).

As the US is perfectly cyclic, the averaging is simply done by superposition of the acquisition traces.

The sensing fiber 3 is permanently filled by a train of frequency coded pulses, each train of N pump pulses corresponds to a distinct line of length N of a coding matrix of dimension N×N. During time, the lines of the coding matrix are scrolled in the sensing fiber.

The coding of length N is based on a circulant matrix (dimension N×N) filled with "1" and "0". "0" can be replaced by "−1".

The chronological order of the pump frequencies (or respectively phase or polarization) is based on a repetitive pattern respectively $\{f_1, f_2, f_3, f_4 \ldots f_{N+1}\}$ for pump 31 and $\{f'_2, f'_3, f'_4 \ldots f'_{N+1}\}$ for pump 32 where "0" (no pump pulse) are applied according to the coding matrix M.

The number of frequencies per pump 31, 32 is exactly N+1.

The decoding process (FIG. 6.c) is made by the inverse matrix $M^{-1}$.

The signal processing consists in regrouping N+1 data packets that are successively decoded by the inverse matrix $M^{-1}$.

After decoding, the position of each signal is retrieved in position and frequency.

For some application fields such as distributed deformation measurement in large critical infrastructures, a conventional scan in frequency is too slow (typically ranging from seconds to minutes, depending on a sensing length). We propose a new approach maintaining the acquisition time as fast as possible, thanks to the unique sequence "US". This latter is generated by the dedicated arbitrary waveform generator 23 (AWG), is perfectly cyclic so that it runs in a loop without dead time, and includes a colour coding that improves the signal-to-noise ratio: in this way, the averaging is reduced to a minimum.

The corresponding unique sequence is based on a circulant square matrix M of dimension N and contains N+1 frequencies, so that the sequence is doubly circulant.

Assuming that three positions are measured in the FUT 3:

the chronological order of the frequencies of the first pump 31 is based on a repetitive pattern $\{f_1, f_2, f_3, f_4\}$ where "zeros" are applied according to the coding matrix M.

likewise, the chronological order of the frequencies of the second pump 32 is based on a repetitive pattern $\{f'_1, f'_2, f'_3, f'_4\}$ where "zeros" are applied according to the coding matrix M.

For each pump 31, 32, the signal processing consists in regrouping N+1 data packets that are successively decoded by the inverse matrix $M^{-1}$ (FIG. 6): the first data packet provides the Rayleigh component, $g_1^1$, $g_2^2$ and $g_3^3$ where $g_i^j$ represents the gain at position i and for the frequency j. The next packet is obtained by a right shift of data, providing Rayleigh component $g_i^2$, $g_2^3$ and $g_3^4$ and so on until all the data are decoded. Note that all these calculations are linear and parallelizable, allowing fast decoding on an acquisition card equipped with Field Programmable Gate Array (FPGA) and/or a Graphics Processing Unit (GPU).

From the unique sequence "US", one obtain a matrix R1 of Rayleigh spectrum over distance (looks more or less like noise).

A second measurement provides a matrix R2 of Rayleigh spectrum over distance.

Without perturbation, R1 and R2 are identical. With any perturbation (temperature, strain, vibration (=strain)), the spectral components will be shifted.

As an illustration, the trace is the Rayleigh backscattering spectrum at a given time t1 and given location I (FIG. 5.a).

The measurement is repeated at time t2, same location (FIG. 5.b).

When looking at t1 and t2 spectra, one sees that they share common features. In fact the spectra appears to be shifted in frequency within the measurement range.

Thus, using for instance correlation function, or least square methods, it is possible to get the frequency shift df, which is proportional to the amount of change in temperature or strain.

The process is repeated for all spectra t1 and t2 at every location.

In the third, fourth or fifth embodiments of a process according to the invention implemented in device 1 and illustrated in FIGS. 7, 8 and 9, the first pump 31 is a chirped optical pulse or a sequence of chirped optical pulses with the first optical frequency changing during each pulse, the second pump 32 being a chirped optical pulse or a sequence of chirped optical pulses with the second optical frequency changing during each pulse, the first optical frequency being always different from the second optical frequency at each given time.

The chirped optical pulse or the sequence of chirped optical pulses with the first optical frequency and/or the chirped optical pulse or the sequence of chirped optical pulses with the second optical frequency comprise a non-linear chirped pulse.

DAS-ch

In a third embodiment of a process according to the invention implemented in device 1 and illustrated in FIG. 7, no intensity or frequency code is used.

Chirp is preferably applied by the AOM 26, then it is possible to remove EOM1 9. EOM2 22 provides the two pumps 31, 32 and the two LO.

The detection principle of DAS-chirp is mainly described in "*Single-shot distributed temperature and strain tracking using direct detection phase-sensitive OTDR with chirped pulses*", Pastor-Graelles et al., 13 Jun. 2016|Vol. 24, No. 12|DOI:10.1364/OE.24.013121|OPTICS EXPRESS 13121:
  a) Chirped pulses 31, 32 are sent down the fibre.
  b) The time trace is shifted, due to a perturbation.
  c) By looking over a time window (or a distance window), for instance 50 points, it is possible to identify the shift
    a. the 50 points from a first measurement M1 are compared with those of a second measurement M2
    b. M2 is shifted in time domain until it matches M1 well
    c. Matching can be achieved by computing a correlation function, or least square The amount of chirp is a way of tuning sensitivity.

Similarly to what happens in a DAS-λ, perturbation will introduce a shift in the RBS spectrum. But the chirp now transfer the frequency variation into the time domain.

Due to a perturbation, the frequency shifted local information is now time shifted. The amount of the time shift thus provides an information on the RBS shift and subsequently to the amount of temperature or strain that causes the shift. It can be assumed that thermal drifts are slow whilst acoustic vibration have higher frequency such that a low pass filter can be used to split the two components.

Looking at the strain as a function of time at any given location provides information on the acoustic perturbation, the same way that it does for the DAS-I or the DAS-phi.

Two orthogonal pumps 31, 32 bring higher power to the fibre 3, thus higher SNR. The EOM 22 provides an accurate control of the chirp whilst keeping an as much as possible square pulse that is suitable for long distance operation.

Frequency Coded DAS-Ch

In a fourth embodiment of a process according to the invention implemented in device 1 and illustrated in FIG. 8, the first pump 31 is a sequence of chirped optical pulses with the starting value of the first optical frequency changing between each of its optical pulses according to a first coded sequence, the second pump 32 being a sequence of chirped optical pulses with the starting value of the second optical frequency changing between each of its optical pulses according to a second coded sequence, the first optical frequency being always different from the second optical frequency at each given time.

A sequence of pulse featuring a portion only of the chirp are send down the fibre 3 (can be a unique sequence or no). The returning RBS is a combination of all the chirped pulses, in the sense of the DAS-λ. The only difference is that, in the RBS, the contribution of each of the pulse contained a chirped information around each frequency components In order to recover the information, the acquired RBS are processed with the decoding matrix in such a way that the time shifted trace due to the chirp is rebuild by adding in the time domain the contribution of the multiple pulses at the different frequencies. The outcome is thus equivalent to the response of the DAS-ch, but with the improvement related to the coding, and is processing according to the DAS-ch Intensity Coded DAS-Ch In a fifth embodiment of a process according to the invention implemented in device 1 and illustrated in FIG. 9, the first pump 31 is a sequence of chirped optical pulses coded in intensity, the second pump 32 being a sequence of chirped optical pulses coded in intensity, the first optical frequency being always different from the second optical frequency at each given time.

Each chirped pulse 31 and 32 is repeated in words "110011010010" where "1" means the pulse is on and "0" means the pulse is off. This can be seen as a Simplex coding of the chirp pulse. Different words are send successively down the fibre 3 (can be a unique sequence, or words can be separated by $T_{FUT}$). Corresponding RBS are acquired and decoded with the inverse coding matrix. The decoded information corresponds to the outcome of the DAS-ch, with the improvement of the coding. The subsequent processing is equivalent to the DAS-ch Of course, the invention is not limited to the examples which have just been described and numerous amendments can be made to these examples without exceeding the scope of the invention. For example, in variants of the previous embodiments:
  chirp is made using the EOM 22 (in this case this symmetry between pump 31 and pump 32 is broken) and/or AOM 26 (the chirp keeps the frequency difference between pump 31 and pump 32 constant), and/or
  the detector arranged for the detection of the first Rayleigh backscattered signal 41 and the detector arranged for the detection of the second Rayleigh backscattered signal 42 can be separated detectors or a common detector. Instead of split detection of pumps 31, 32: direct detection assumed, mixed signals 41, 42 on a balanced detector (to remove DC components) can be considered as an option. The Rayleigh response to temperature/strain is slightly different between the two frequencies of signals 41 and 42 so that it is possible to work in differential mode by making the difference of the Rayleigh signals shifts. This reduces the sensitivity of the system, making it suitable for the detection of large event only and thus solving the challenge of the DAS extreme sensitivity. Nevertheless, the first detection of a first Rayleigh backscattered signal is still separated from the second detection of the second Rayleigh backscattered signal thanks to the two separate parts of the balanced detector; and/or
  if pumps 31, 32 are not simultaneous but are delayed, then time synchronization can be used in the detection system, i.e. for the detection of the first Rayleigh backscattered signal 41 and for the detection of the second Rayleigh backscattered signal 42, i.e. in the detector arranged for the detection of the first Rayleigh backscattered signal 41 and in the detector arranged for the detection of the second Rayleigh backscattered signal 42.

Of course, the different characteristics, forms, variants and embodiments of the invention can be combined with each other in various combinations to the extent that they are not incompatible or mutually exclusive. In particular all variants and embodiments described above can be combined with each other.

The invention claimed is:

1. A process comprising the following steps:
   injecting in an optical fiber a first optical pump at a first optical frequency ($f_1, f_2, f_3, f_4$) that evolves in time or not, and a second optical pump at a second optical frequency ($f'_1, f'_2, f'_3, f'_4$) that evolves in time or not, the first optical frequency and the second optical frequency being different at each given time;
   a first detection of a first Rayleigh backscattered signal at the first optical frequency from the optical fiber;
   a second detection, separated from the first detection, of a second Rayleigh backscattered signal at the second optical frequency from the optical fiber;
   analyzing the detected first Rayleigh backscattered signal and the detected second Rayleigh backscattered signal; and
   the first second optical frequencies have, in absolute value, the same frequency difference with respect to a source frequency ($f_0$), the source frequency remaining constant in time.

2. The process according to claim 1, the first optical pump and the second optical pump are delayed in the step of injecting.

3. The process according to claim 1, the first optical pump and the second optical pump are injected simultaneously into the optical fiber in the step of injecting.

4. The process according to claim 1, characterized in that the first detection and the second detection are locked on the first optical pump or on the second optical pump thanks to a synchronous detection.

5. The process according to claim 1, characterized in that the first pump is an optical pulse or a sequence of optical pulses with the first optical frequency being constant in time, the second pump being an optical pulse or a sequence of optical pulses with the second optical frequency being constant in time.

6. The process according to claim 1, characterized in that the first optical pump and the second optical pump have orthogonal polarizations.

7. The process according to claim 6, characterized in that the first detection and the second detection are done respectively on two different optical ways after a separation of the first Rayleigh backscattered signal and the second Rayleigh backscattered signal preferably by a fibre bragg grating.

8. The process according to claim 1, characterized in that the first pump and the second pump are simultaneously generated from a common source signal.

9. The process according to claim 8, characterized in that the source signal has an optical frequency equal to the source frequency ($f_0$).

10. The process according to claim 1, characterized in that the first pump is a chirped optical pulse or a sequence of chirped optical pulses with the first optical frequency changing during each pulse, the second pump being a chirped optical pulse or a sequence of chirped optical pulses with the second optical frequency changing during each pulse, the first optical frequency being always different from the second optical frequency at each given time.

11. The process according to claim 10, characterized in that the chirped optical pulse or the sequence of chirped optical pulses with the first optical frequency and/or the chirped optical pulse or the sequence of chirped optical pulses with the second optical frequency comprise a non-linear chirped pulse.

12. The process according to claim 1, characterized in that the first pump is a sequence of optical pulses with the first optical frequency changing between each of its optical pulses according to a first coded sequence, the second pump being a sequence of optical pulses with the second optical frequency changing between each of its optical pulses according to a second coded sequence, the first optical frequency being always different from the second optical frequency at each given time.

13. The process according to claim 12, characterized in that all the pulses of the first pump and of the second pump have a same intensity that is constant in time.

14. The process according to claim 12, characterized in that the first coded sequence comprises:
   at least N iterations, N being an integer at least equal to 2, of a sub-sequence comprising N+1 pulses at N+1 different optical frequencies
   but with a switched-off pulse of the sub-sequence every N pulse of the sub-sequence.

15. The process according to claim 1, characterized in that the first optical frequency changes in time according to a first coded sequence, the second optical frequency changes in time according to a second coded sequence, the first optical frequency being always different from the second optical frequency at each given time.

16. The process according to claim 15, characterized in that the first coded sequence and second coded sequence have a same temporal period and are reiterated in time.

17. The process according to claim 16, characterized in that the temporal period is substantially equal to twice the length of the optical fiber divided by a speed of light in the optical fiber.

18. A device comprising:
   injection means arranged for injecting in an optical fiber a first optical pump at a first optical frequency that evolves in time or not, and a second optical pump at a second optical frequency that evolves in time or not, the first optical frequency and the second optical frequency being different at each given time;
   a detector arranged for a first detection of a first Rayleigh backscattered signal at the first optical frequency from the optical fiber;
   a detector arranged for a second detection, separated from the first detection, of a second Rayleigh backscattered signal at the second optical frequency from the optical fiber;
   means for analyzing the detected first Rayleigh backscattered signal and the detected second Rayleigh backscattered signal; and
   the injection means are arranged so that the first and second optical frequencies have, in absolute value, the same frequency difference with respect to a source frequency ($f_0$), the source frequency remaining constant in time.

19. The device according to claim 18, the injection means is arranged for injecting in a delayed way the first optical pump and the second optical pump in the optical fiber.

20. The device according to claim 18, the injection means arranged for simultaneously injecting the first optical pump and the second optical pump in the optical fiber.

21. The device according to claim 18, characterized in that the detector arranged for the first detection and the detector arranged for the second detection are locked on the first optical pump or on the second optical pump thanks to a synchronous detection.

22. The device according to claim 18, characterized in that the injection means are arranged so that the first pump is an optical pulse or a sequence of optical pulses with the first optical frequency being constant in time, the second pump being an optical pulse or a sequence of optical pulses with the second optical frequency being constant in time.

23. The device according to claim 18, characterized in that the first optical pump and the second optical pump have orthogonal polarizations.

24. The device according to claim 23, characterized in that the detector arranged for the first detection and the detector arranged for the second detection are two distinct detectors located on two different optical ways after separation means arranged for a separation of the first Rayleigh backscattered signal and the second Rayleigh backscattered signal, the separation means preferably comprising a fibre bragg grating.

25. The device according to claim 18, characterized in that the injection means are arranged for simultaneously generating the first pump and the second pump from a common source signal.

26. The device according to claim 25, characterized in that the injection means are arranged so that the source signal has an optical frequency equal to the source frequency ($f_0$).

27. The device according to claim 18, characterized in that the injection means are arranged so that the first pump is a chirped optical pulse or a sequence of chirped optical pulses with the first optical frequency changing during each pulse, the second pump being a chirped optical pulse or a sequence of chirped optical pulses with the second optical frequency changing during each pulse, the first optical frequency being always different from the second optical frequency at each given time.

28. The device according to claim 27, characterized in that the injection means are arranged so that the chirped optical pulse or the sequence of chirped optical pulses with the first optical frequency and/or the chirped optical pulse or the sequence of chirped optical pulses with the second optical frequency comprise a non-linear chirped pulse.

29. The device according to claim 18, characterized in that the injection means are arranged so that the first pump is a sequence of optical pulses with the first optical frequency changing between each of its optical pulses according to a first coded sequence, the second pump being a sequence of optical pulses with the second optical frequency changing between each of its optical pulses according to a second coded sequence, the first optical frequency being always different from the second optical frequency at each given time.

30. The device according to claim 29, characterized in that the injection means are arranged so that all the pulses of the first pump and of the second pump have a same intensity that is constant in time.

31. The device according to claim 29, characterized in that the injection means are arranged so that the first coded sequence comprises:
- at least N iterations, N being an integer at least equal to 2, of a sub-sequence comprising N+1 pulses at N+1 different optical frequencies
- but with a switched-off pulse of the sub-sequence every N pulse of the sub-sequence.

32. The device according to claim 18, characterized in that the injection means are arranged so that the first optical frequency changes in time according to a first coded sequence, the second optical frequency changes in time according to a second coded sequence, the first optical frequency being always different from the second optical frequency at each given time.

33. The device according to claim 32, characterized in that the injection means are arranged so that the first coded sequence and second coded sequence have a same temporal period and are reiterated in time.

34. The device according to claim 33, characterized in that the injection means are arranged so that the temporal period is equal to twice the length of the optical fiber divided by a speed of light in the optical fiber.

* * * * *